United States Patent
Miller et al.

(10) Patent No.: US 9,061,304 B2
(45) Date of Patent: Jun. 23, 2015

(54) METHOD AND APPARATUS FOR A CLEAN CUT WITH A LASER

(75) Inventors: Daniel B. Miller, New Richmond, WI (US); David A. Nyberg, New Richmond, WI (US); James J. Bucklew, Somerset, WI (US); Timothy T. Struemke, Somerset, WI (US)

(73) Assignee: PRECO, INC., Somerset, WI (US)

( * ) Notice: Subject to any disclaimer, the term of this patent is extended or adjusted under 35 U.S.C. 154(b) by 307 days.

(21) Appl. No.: 13/583,297

(22) PCT Filed: Aug. 27, 2012

(86) PCT No.: PCT/US2012/052466
§ 371 (c)(1),
(2), (4) Date: Sep. 7, 2012

(87) PCT Pub. No.: WO2013/029038
PCT Pub. Date: Feb. 28, 2013

(65) Prior Publication Data
US 2013/0146674 A1 Jun. 13, 2013

Related U.S. Application Data

(60) Provisional application No. 61/527,171, filed on Aug. 25, 2011.

(51) Int. Cl.
*B23K 26/14* (2014.01)
*B23K 26/36* (2014.01)
(Continued)

(52) U.S. Cl.
CPC ................. *B05B 13/00* (2013.01); *B23K 26/36* (2013.01); *B23K 26/14* (2013.01); *B23K 26/38* (2013.01); *B23K 26/1405* (2013.01);
(Continued)

(58) Field of Classification Search
CPC ........ B23K 26/00; B23K 26/14; B23K 26/36; B23K 26/16
USPC .............. 219/121.67–121.72, 121.84, 121.86
See application file for complete search history.

(56) References Cited

U.S. PATENT DOCUMENTS 4,149,062 A 4/1979 Limmer et al.
5,925,024 A * 7/1999 Joffe ............................. 604/313
(Continued)

FOREIGN PATENT DOCUMENTS

FR 2627409 8/1989
JP 02142696 A * 5/1990
(Continued)

OTHER PUBLICATIONS

International Search Report and Written Opinion; PCT/US2012/052466; Nov. 15, 2012.

*Primary Examiner* — Samuel M Heinrich
(74) *Attorney, Agent, or Firm* — Westman, Champlin & Koeher, P.A.; Z. Peter Sawicki; Amanda Prose

(57) ABSTRACT

A method for preventing a plume from contaminating a surface of material that has been cut by a laser or focusing optic wherein the laser produces the plume, the method comprises providing a first airflow beneath the plume with the airflow redirecting the plume away from the surface of the material. A second airflow is provided to further lift the plume to an exhaust. Apparatus is configured to direct first and second air flows such that the plume is not deposited on the material being cut by the laser or on the focusing optic.

31 Claims, 6 Drawing Sheets

Figure 1:
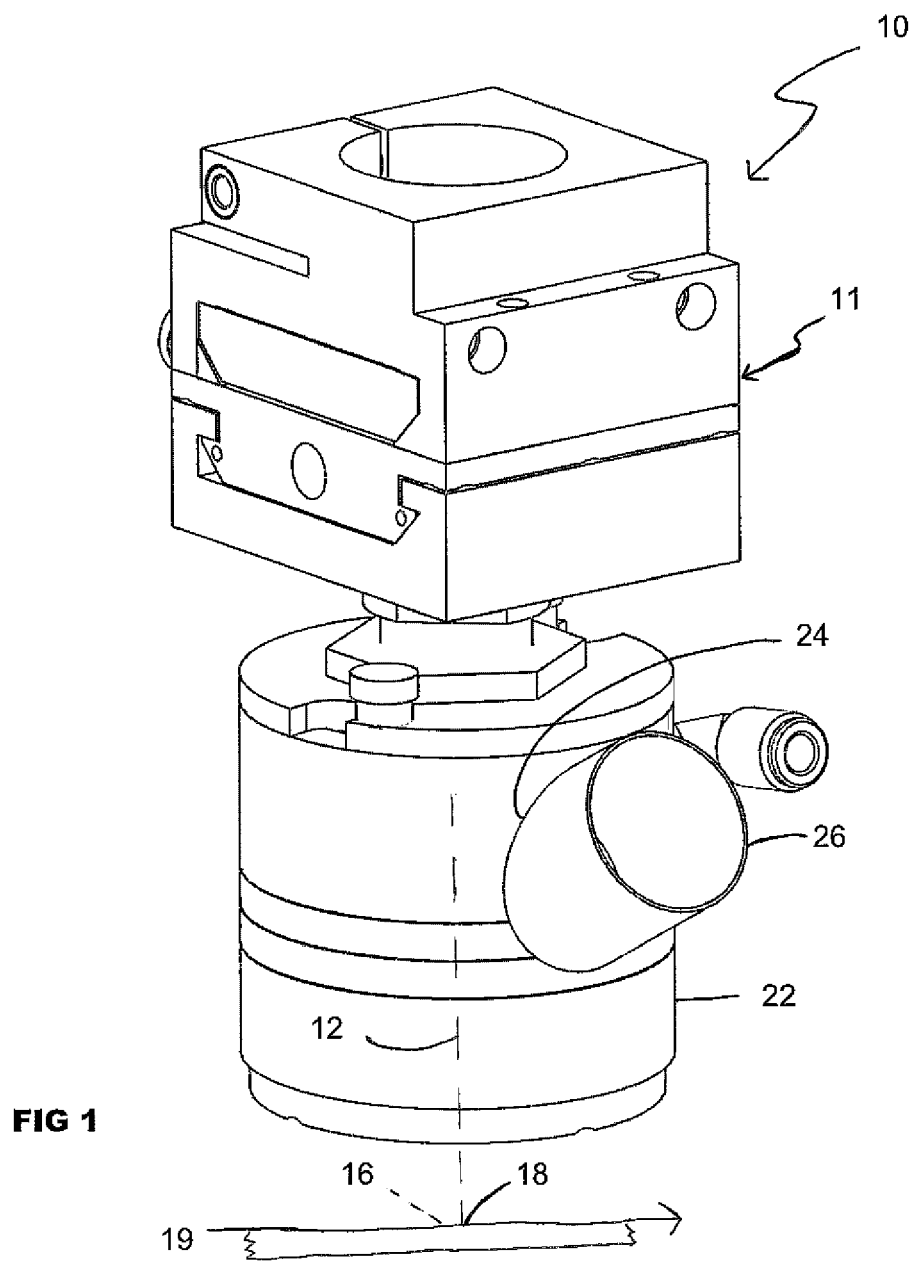

(51) Int. Cl.
*B05B 13/00* (2006.01)
*B23K 26/38* (2014.01)
*B23K 26/40* (2014.01)

(52) U.S. Cl.
CPC ........ *B23K 26/1476* (2013.01); *B23K 26/4065* (2013.01); *B23K 2201/16* (2013.01); *B23K 2201/18* (2013.01)

(56) References Cited

U.S. PATENT DOCUMENTS

| | | | |
|---|---|---|---|
| 6,149,755 A | 11/2000 | McNichols et al. | |
| 6,586,707 B2 | 7/2003 | Boyle et al. | |
| 7,863,542 B2 | 1/2011 | Murase et al. | |
| 8,153,928 B2 | 4/2012 | Aubert et al. | |
| 2004/0226927 A1 | 11/2004 | Morikazu et al. | |

FOREIGN PATENT DOCUMENTS

| | | | |
|---|---|---|---|
| JP | 2224886 | | 9/1990 |
| JP | 03234390 A | * | 10/1991 |
| JP | 11141822 | | 5/1999 |
| JP | 2001314985 | | 11/2001 |
| JP | 2003251486 A | * | 9/2003 |
| RU | 2172233 | | 8/2001 |
| WO | 2005/118210 A1 | | 12/2005 |
| WO | 2005/120763 A2 | | 12/2005 |

* cited by examiner

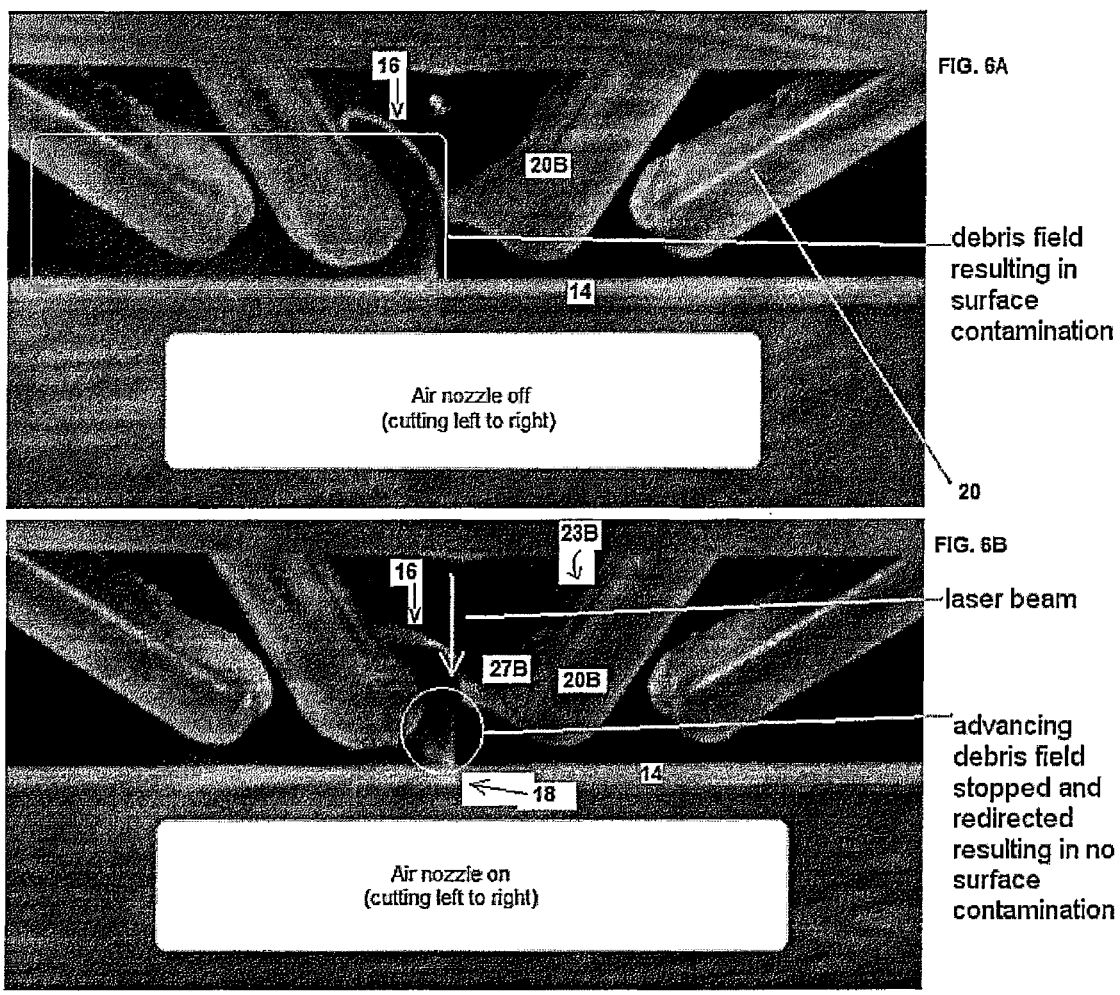

METHOD AND APPARATUS FOR A CLEAN CUT WITH A LASER

CROSS-REFERENCE TO RELATED APPLICATION

This Application is a Section 371 National Stage Application of International Application No. PCT/US2012/052466, filed Aug. 27, 2012 in English, which claims priority to U.S. provisional patent application Ser. No. 61/527,171, filed Aug. 25, 2011 the contents of which are hereby incorporated by reference in their entirety.

FIELD

The present disclosure relates generally to the use of a laser beam for cutting sheet material or films. More particularly, this disclosure relates to making a clean cut with a laser.

BACKGROUND

Cutting material with a laser in many applications produces a clean cut. Generally the material being cut is completely vaporized into a clear gaseous component. There are situations, depending on the type of laser being used and the material being cut, wherein the cutting produces degradation components that are visible. There are applications wherein a clean-cut is very desirable, if not necessary. Such visible degradation components are detrimental to many uses of polymeric film or sheet material. Applications where a clean-cut is desirable when the sheet material or film requires clear visual appearance or unperturbed optical properties.

Past attempts for removing visible degradation components include positioning a vacuum source such as a cutting surface having a plurality of vacuum holes through which a vacuum is pulled. Such a vacuum box is on a side opposite of the laser beam cutting the material. The degradation components (referred to as debris) then flow in the direction of the air suction.

Other attempts to do away with the debris and discoloration include masking one or both surfaces of the film. The masking results in additional costs in both masking material and the additional step of removing the masking material after the material is cut.

SUMMARY

This disclosure describes a method for preventing a plume from contaminating a surface of material that has been cut by a laser. The cutting laser produces a plume, the method comprises providing a first airflow beneath the plume. The first airflow redirects the plume away from the surface of the material. A second airflow is provided to further lift the plume to an exhaust.

An apparatus is also disclosed herein, wherein the apparatus includes at least one nozzle for directing the first airflow towards a laser cut site in a manner sufficient to lift the plume. The nozzle also directs a second airflow for further lifting the plume. An exhaust chamber is positioned in such a manner to engage the plume from the second airflow, thereby evacuating the plume.

This disclosure also describes a method for preventing a plume generated by a cutting laser from contaminating a surface of a material being cut, the plume resulting from the laser cutting. The method comprises providing a fan shaped air stream and directing the fan shaped air stream to lift the plume such that the plume does not deposit debris on the surface of the material.

This disclosure also describes a method for preventing a plume generated by a cutting laser from contaminating a focusing optic and components of a focus head thereby reducing the frequency of required cleaning. The method comprises providing a downward movement air curtain moving away from the focusing optic while simultaneously directing the plume into an exhaust duct with three horizontal air knives. The exhaust duct is orientated to minimize debris collection on the walls of the exhaust duct.

A BRIEF DESCRIPTION OF THE DRAWINGS

Figure 2:
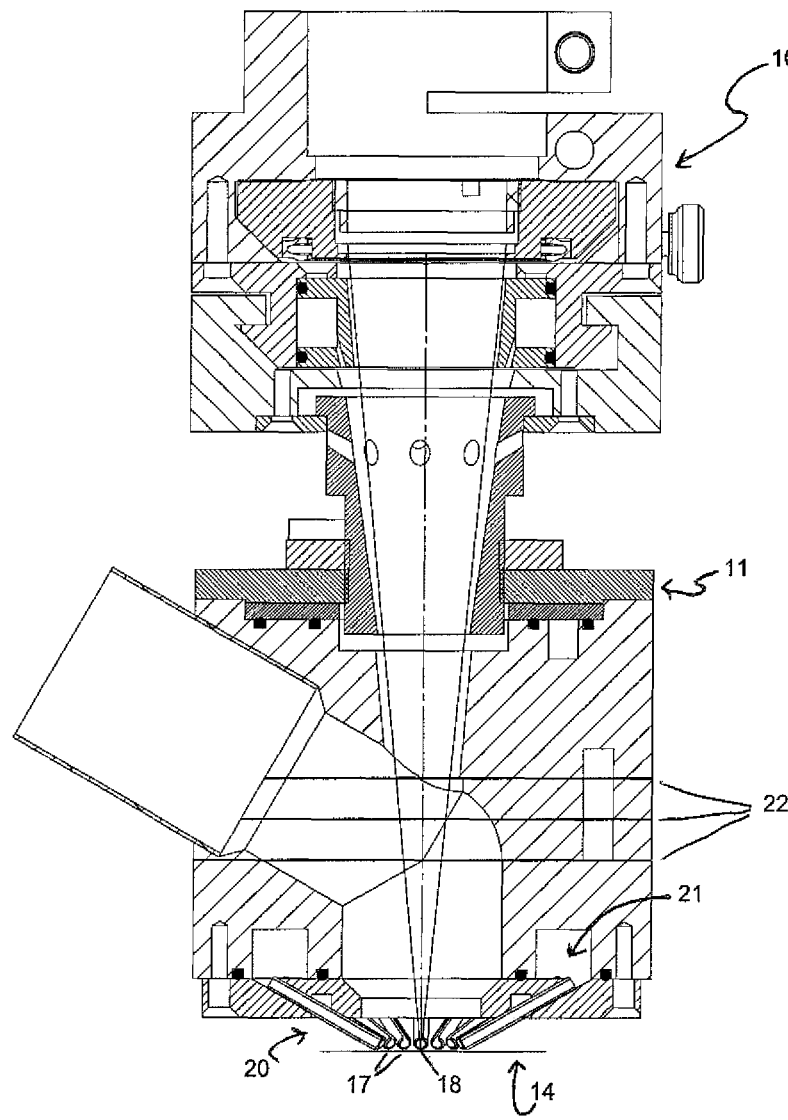
Figure 3:
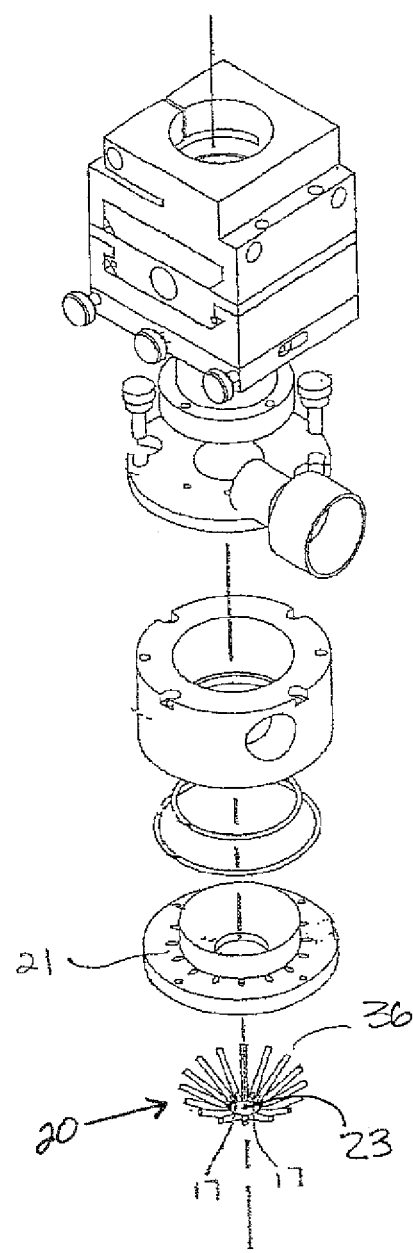
Figure 4A:
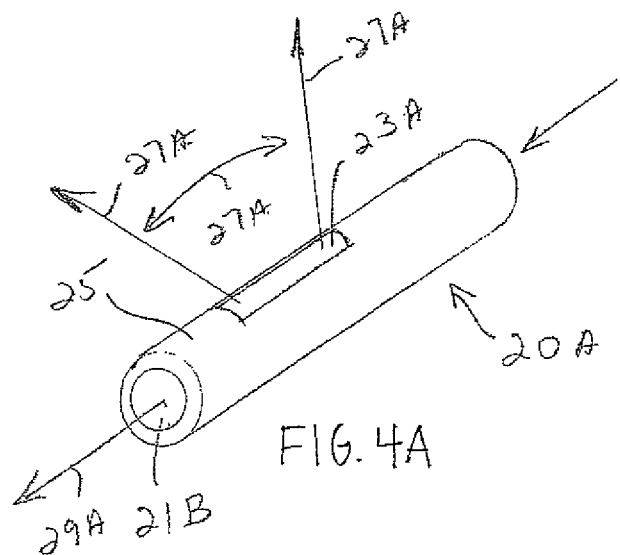
Figure 4B:
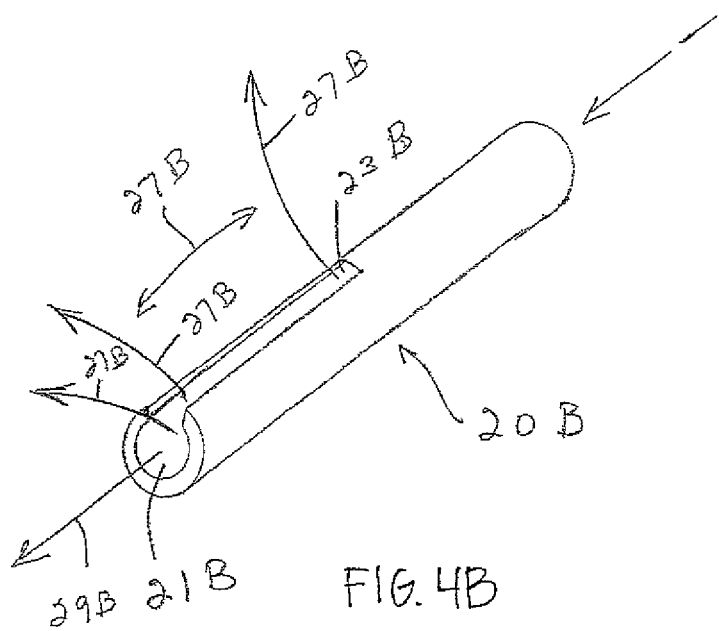
Figure 5:
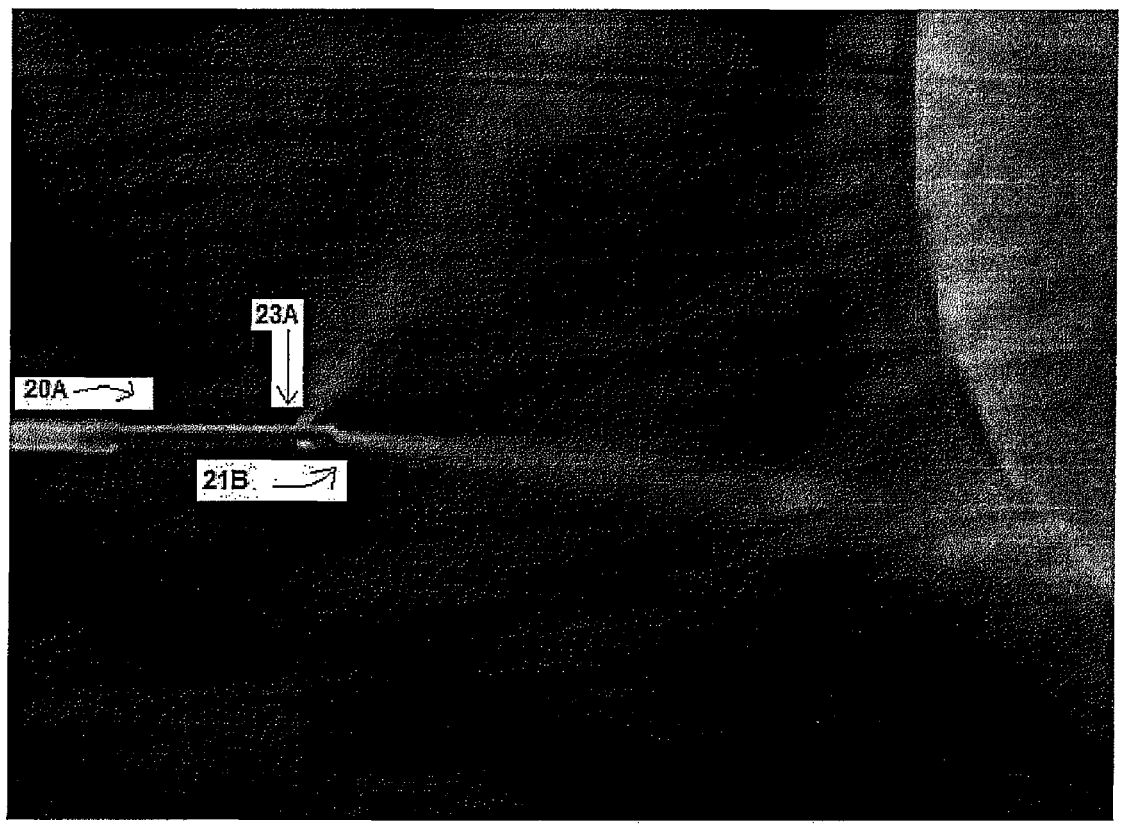

FIG. 1 is a perspective view of the apparatus disclosed herein.
FIG. 2 is a cross-sectional view thereof.
FIG. 3 is an exploded perspective view thereof.
FIGS. 4A and 4B are perspective views of a nozzle.
FIG. 5 is a photographic view showing airflow from a nozzle.
FIG. 6 includes microphotographs of nozzles positioned during a laser cut.

DETAILED DESCRIPTION OF ILLUSTRATIVE EMBODIMENTS

It was initially believed that when film was cut with a laser beam, the discoloration that resulted at the cut site was caused directly by the energy produced by the tip of the laser beam. The debris found on the cut was also thought to be generated at the point of cutting and its deposition on the cut occurring at the cut site. This belief was based on the theory that debris was formed due to the heat generated by the laser beam at the focal point. It was thought that the intense heat produced vaporization, melting and actual bits of the material being expelled at the cut site due to the intense energy (heat) being generated at the focal point. Similarly, it was believed that the discoloration was a result of thermal degradation of the material being cut.

What has been surprisingly found was that the cut produced by the laser beam was a clean cut without discoloration and debris. It was found that the discoloration and depositing of debris was a post-secondary event. This discovery occurred upon viewing photomicrographs of the end of a cut produced by a laser beam. When the cut was viewed, it was noticed that approximately the last 3/16 inches of the cut contained no discoloration and no debris.

When photomicrographs were taken of a laser beam in the act of cutting, a plume was observed. The plume was forming at the cut site and then arching in a direction of travel of the web. By the word "plume" as used herein, describes a mass of particulate matter that is generated by the cutting of a laser which can be seen in a photomicrograph. The plume may include gaseous components along with particulate matter. In view of this, it was determined that the discoloration of the cut was not a direct result of the heat being generated by the energy of the laser beam and that the debris being formed was not being immediately deposited at the cut site. Instead, the discoloration and debris was the result of the plume falling back on the cut surfaces and adjacent areas and adhering to the cut surfaces and adjacent areas resulting in the observed discoloration and debris. The plume, as observed in photomicrographs, is discussed further in this application and the plume is shown in the photomicrographs in FIG. 6 and described subsequently.

Once the laser beam contacts the surface of the sheet material or film, debris and other matter begin to be ejected from the cut site in the form of a plume extending in the same direction as the film is moving. In the case of stationary sheet material and the tip of the laser beam moving, the plume would be forming in a direction opposite to the movement of the tip of the laser beam cutting the sheet material. The constituents of the plume are not truly known but are believed to be debris formed by the laser cutting the material and reactants formed by the heat of the laser beam in the form of a gaseous component, the gaseous component containing particulate matter and/or true gaseous products formed by the thermal cutting.

Immediately upon forming, the plume remains airborne relative to the material only for a limited amount of time. As the plume remains airborne, the area of the cut directly below the plume is clean since the contents of the plume have not had a chance to make contact with the cut. To avoid the contents of the plume from falling and adhering to the cut, the plume according to this disclosure has been re-directed.

The plume has been redirected upwardly, away from the cut site. A stream of air is directed at the cut site engaging the cut site and getting beneath the plume to lift the plume upwardly. The stream of air also includes a component that is not directed to the cut site but is directed in a manner to further lift the plume away from the cut site. The two components may be two separate airstreams or one continuous airstream depending on the configuration of the device delivering the airstream to the cut site. Both air streams are not circulatory, rotary or spiral in nature such as to form a vortex or a spiral shaped air stream. Both air streams are intended to lift and debris prior to the debris falling on the film. The phrase "fan shaped" is used herein to describe the airflow in this disclosure and for purposes of this application should be defined as an upward airflow substantially straight in direction without a majority of the air stream having a circulatory or spiral motion. For purposes of this application, a vortex has a majority of airflow in a circulatory or spiral manner.

The method and apparatus disclosed herein for making a "clean cut" with a laser is applicable to both "through cuts", a cut that is made completely through the material and a "kiss cut" which is a cut that does not extend entirely through the material.

In the case of a through cut, a plume may still form on the top surface of the material being cut even though a vacuum source is positioned on a bottom surface of the material. Some of the debris may be taken up by the vacuum source along the bottom surface, but the plume being generated along the top surface still has to be addressed in order to keep the top surface clean. The method and apparatus of this disclosure is useful in keeping the top surface clean from such visible degradation components.

When sheet material or film is "kiss cut", the plume being generated may be more pronounced. The term "kiss cut" is a term of art which means cutting a top layer or several top layers of a material without cutting through an adjacent layer. The adjacent layer can be an adhesively adhered backing or it may be a support on which the film is moving over and being supported during the cutting operation. In the latter situation the tip (focal point) of the laser beam may not cut entirely through the film or barely cuts through the film. The method and apparatus disclosed herein is intended to also manage the plume while "kiss cutting" to obtain a clean-cut surface.

A plurality of nozzles are used to deliver the airstream to the cut site and to lift the plume away from the cut site. Each nozzle is in the faun of a cannula that is a device with a cylindrical housing having a passageway extending through the cylindrical housing. The nozzles are spaced apart from one another radiating outwardly from a common center with the air outlets of the nozzles being disposed in circular arrangement. The nozzles are also positioned at a selected angle from horizontal for delivering the airstream to the cut site at such angle. The airstream hits the cut site which results in an upward movement of air beneath the plume carrying the plume upwardly. When the plume is lifted sufficiently away from the cut site, the plume is further removed by an exhaust element such as a vacuum.

Each of the nozzles also include a slot facing in a generally upward direction. The slot provides a component of air that further lifts the plume. The slot provides this further component of air in a fan-like configuration that is in a generally vertical posture. The slot may be separated from the outlet end of the nozzle by a section of housing or the slot can be configured to begin at the outlet end of the nozzle, thereby being continuous with the outlet end.

In certain situations, a single nozzle may be used. In other situations, less than a full complement of nozzles whose outlet ends may not form a complete circular arrangement. Such configurations have limitations when the laser cutting is done in directions other than a straight line.

The air can also be supplied through devices other than a plurality of nozzles. Other devices which supply the air in the configuration described above are contemplated to be within this disclosure. One such device is a circular air knife wherein the air knife delivers an airstream at the selected angle to the cut site to lift the plume and has an air component that further lifts the plume.

FIGS. 1 and 2 illustrate a perspective and a cross-sectional view, respectively, of a laser processing apparatus 10 according to one embodiment of the present disclosure. Laser processing apparatus 10 includes a housing 11. A path for a laser beam 12 extends along a central axis 13 of the housing 11. The laser beam 12 comes into contact with material 14 at a cut site 18 below the housing 11. The material 14 as discussed can be either sheet material or film, but could also include other forms. In the particular example being discussed herein, the material is a film. The film 14 travels from a roll (not shown) and moves relative to the cut site 18 in a direction indicated by arrow 19. The film 14 is taken up by a take-up roller (not shown). As used herein, the word "film" is intended to include the other forms of material 14 discussed above.

The laser processing apparatus 10 further includes a plurality of nozzles 20 as best illustrated in FIGS. 2 and 3. The plurality of nozzles 20 are used to supply air to the cut site 18 in order to lift and carry the plume 16 from the film. In the apparatus illustrated, the nozzles 20 are positioned in a radial arrangement, the axis of each nozzle passing through a common center 23, the common center being approximately the cut site. The nozzles each include an outlet 17 from which air is directed to the cut site 18. The air to all of the nozzles 20 is supplied from a common annular manifold 21. The air is supplied to the annular manifold 21 from an air source (not shown) by way of an inlet port (not shown).

As illustrated the apparatus 10 is useful in managing a plume even when the direction of the cut is changed. Since air is being applied to the cut site from a 360-degree range, the plume will be taken up regardless of the direction of the cut. In configurations where the nozzles are arranged in a configuration that does not provide air from a 360 degree range even down to 1 nozzle, the apparatus may have to be made to rotate such that the air is provided to lift the plume as described herein.

The nozzles individually also include a slot 23, as best illustrated in FIGS. 4A and 4B. The slot 23 faces in a general upward direction. Therefore as air is blown out of the outlet end 21 towards the cut site, air is also blown upwardly through the slot 23.

As best illustrated in FIG. 4A, which shows an embodiment of a slot 23A that does not extend to the outlet 21, being separated from the outlet 21 by a portion of nozzle housing 25, the air exiting the slot 23A is in a fan configuration as indicated by arrows 27A. FIG. 5 includes a photograph that shows air being expelled from the outlet 21B of the nozzle 20B and air being expelled from the slot 23A.

A nozzle 20B is illustrated in FIG. 4B that includes a slot 23B that extends to outlet 21B, thereby providing a continuous outlet for air. The air not only exits the outlet 21B as indicated by arrow 29B toward the cut site but also exits the slot 23B in a fan configuration as indicated by arrows 27B to further lift the plume.

The nozzle 20B is further illustrated in microphotographs in FIGS. 6A and 6B. FIG. 6A is a microphotograph showing contamination of the cut when there is no air flow coming out of the nozzle. The nozzle 20B is shown in FIG. 6B in relation to the plume 16 being redirected. FIG. 6B shows air coming out of the nozzle being directed at the cut with the advancing debris field stopped and redirected resulting in no surface contamination of the film being cut. (In FIG. 6A the approximately 3/16 inch debris free zone described previously cannot be viewed since the microphotograph shows the cut advancing toward and away from the viewer. If a microphotograph from an overhead view would be taken, the debris field free zone would be shown in somewhat of a "C" pattern.)

As illustrated in FIGS. 2 and 3, 16 nozzles 20 are arranged with the nozzle outlets 21 being disposed in a circular configuration. Since the nozzles 20 are also disposed at an angle with respect to horizontal, the nozzles collectively form a truncated cone-like shape. In one embodiment, the diameter of the nozzles 20 are approximately 0.08 inches. The lower nozzle tips 30 are spaced approximately 0.35 inches apart from one another. It has been determined that if the lower nozzle tips 30 are spaced approximately 0.25 inches or approximately 0.375 inches, the air exiting the nozzles 20 will not pick up the plume 16 and the contents of the plume 16 will fall and adhere to the cut and adjacent areas of the film. However, it should be understood that this phenomena may be a result of the size and configuration of the particular nozzles being described. Other nozzle designs and configurations are included.

The amount of air passing through the nozzles, whether measured in volume or force, also needs to be monitored. It will be appreciated that too much air pressure may cause so much turbulence that the contents of the plume will be forced onto the film instead of being lifted away from the film.

Directly above the nozzles 20 the apparatus 10 includes an annular vacuum chamber 24. Vacuum is pulled on the vacuum chamber 24 by way of an exhaust duct such as a vacuum port 26 which in turn is attached to a vacuum source (not shown). It was found that using only a vacuum to attempt to pick up the plume and avoid the contents of the plume from falling on the cut site was unsuccessful. Using too strong of a vacuum is not possible when a film is being cut since the position of the film may be affected. The film may be lifted upwardly thereby moving the cutting site from the focal point of the laser beam.

A plurality of horizontal air knives 22 may also be used to direct the plume into the exhaust duct. It has been found that more than 1 air knife was needed and 3 air knives work well. In the present disclosure, the air knives 22 are being used to further lift the plume into the exhaust.

Depending on the material being laser cut the amount of debris can be substantial and it often occur that a significant amount of debris can stick to the inner surfaces of the vacuum chamber and even make its way into the upper chamber 13 and contaminate the focusing optic. Frequent cleaning of these surfaces causes unsatisfactory down time in production conditions. To address these issues and minimize production down time due to cleaning the focus head components and optic a method was developed to create an air shower in the upper chamber 13 that flows downward into the lower vacuum chamber and out of the vacuum port 26. To minimize the amount of debris that sticks to the inner surfaces of the lower vacuum chamber and the vacuum port walls multiple horizontal air knives 22 are used to deflect the upward moving plume toward the vacuum port 26. The vacuum port (exhaust duct) 26 is also orientated at an angle so that the exiting plume of debris does not make any sharp turns thereby causing areas with increased debris collection.

Although the present invention has been described with reference to preferred embodiments, workers skilled in the art will recognize that changes may be made in form and detail without departing from the spirit and scope of the invention.

What is claimed is:

1. A method for preventing a plume generated by a cutting laser from contaminating a surface of material, the plume resulting from the laser cutting, the method comprising:
   providing a fan shaped air stream;
   directing the fan shaped air stream to lift the plume such that the plume does not deposit debris on the surface of the material.

2. The method of claim 1 wherein the fan shaped air stream has a generally vertical movement.

3. The method of claim 1 and further comprising providing a vacuum to take up the plume.

4. The method of claim 1 wherein the fan shaped air stream comes from a nozzle.

5. The method of claim 4 and further comprising a plurality of nozzles positioned in a radial arrangement, the nozzles pointing to a common center.

6. The method of claim 1 wherein the fan shaped air stream has a generally vertical movement.

7. The method of claim 1 wherein the shaped air stream redirects the plume away from the surface of the material prior to any debris from the plume falling on the surface of the material.

8. The method of claim 1 and further comprising providing air flow from an air knife to move the plume into an exhaust.

9. The method of claim 8 and further comprising a plurality of air knives.

10. A method for preventing a plume from contaminating a surface of material that has been cut by a laser, the laser producing the plume, the method comprising:
    providing a first air flow beneath the plume, the first air flow redirecting the plume away from the surface of the material; and
    providing a second air flow to further lift the plume to an exhaust.

11. The method of claim 10 and further comprising providing a vacuum to take up the plume at the exhaust.

12. The method of claim 10 wherein the first air flow comes from a nozzle.

13. The method of claim 12 wherein the nozzle includes a housing and wherein a portion of the housing defines the first and second airflow.

14. The method of claim 12 and further comprising a plurality of nozzles positioned in a radial arrangement, the nozzles pointing to a common center.

15. The method of claim 10 wherein the first and second air flows are fan shaped air flows.

16. The method of claim 15 wherein the fan shaped air flow has a generally vertical movement.

17. The method of claim 12 wherein the first and second air flows are separate air flows coming from the nozzle.

18. The method of claim 10 wherein the first air flow redirects the plume away from the surface of the material prior to any debris from the plume falling on the surface of the material.

19. The method of claim 10 and further comprising providing a third air flow from an air knife to move the plume into the exhaust.

20. The method of claim 19 and further comprising a plurality of air knives.

21. An apparatus for preventing a plume from contaminating a surface of a material being cut by a laser, the plume resulting from the laser cutting the surface of the material, the apparatus comprising:
   at least one nozzle that directs a first airflow towards a laser cut site sufficient to lift the plume, and the nozzle also directing a second airflow for further lifting the plume.

22. The apparatus of claim 21 and further comprising a vacuum chamber.

23. The apparatus of claim 21 wherein the nozzle is configured to form the first and second airflows in a shape of a fan.

24. The apparatus of claim 23 wherein the nozzle is configured to form the fan shaped airflow in a generally vertical movement.

25. The apparatus of claim 21 wherein the nozzle has a housing and a portion of the housing defines the first and second airflows.

26. The apparatus of claim 21 and further comprising a plurality of nozzles positioned in a radial arrangement, the plurality of nozzles pointing to a common center.

27. The apparatus of claim 21 wherein the at least one nozzle is configured to direct the first airflow such that no debris from the plume is deposited on the surface of the material.

28. The apparatus of claim 21 and further comprising a plurality of air knives for further lifting the plume to an exhaust.

29. A method for preventing a plume generated by a cutting laser from contaminating a focusing optic or components of a focus head, the plume resulting from the laser cutting, thereby reducing the frequency of required cleaning, the method comprising:
   providing a downward movement air curtain moving away from the focusing optic;
   directing the plume into an exhaust duct with a plurality horizontal air knives; and
   orientating the exhaust duct to minimize debris collection on the walls of the exhaust duct.

30. The method of claim 29 wherein the exhaust duct includes a vacuum.

31. The method of claim 29 wherein the plurality of air knives comprises three.

* * * * *